(12) United States Patent
Mörtendorfer et al.

(10) Patent No.: US 7,009,143 B2
(45) Date of Patent: Mar. 7, 2006

(54) METHOD FOR SOLDERING WORK PIECES

(75) Inventors: Bernhard Mörtendorfer, Ried im Traunkreis (AT); Martin Gatterbauer, Weis (AT)

(73) Assignee: FRONIUS International GmbH, Pettenbach (AT)

( * ) Notice: Subject to any disclaimer, the term of this patent is extended or adjusted under 35 U.S.C. 154(b) by 206 days.

(21) Appl. No.: 10/470,209

(22) PCT Filed: Jan. 31, 2002

(86) PCT No.: PCT/AT02/00036

§ 371 (c)(1),
(2), (4) Date: Jul. 25, 2003

(87) PCT Pub. No.: WO02/064300

PCT Pub. Date: Aug. 22, 2002

(65) Prior Publication Data

US 2004/0050832 A1    Mar. 18, 2004

(30) Foreign Application Priority Data

Feb. 9, 2001    (AT) ............................... A 204/2001

(51) Int. Cl.
*B23K 1/00*    (2006.01)
(52) U.S. Cl. ..................... 219/129; 219/75; 219/121.46
(58) Field of Classification Search ................ 219/129, 219/75, 136, 137 PS, 121.45, 121.46
See application file for complete search history.

(56) References Cited

U.S. PATENT DOCUMENTS

| 4,087,671 A | 5/1978 | Essers |
| 4,580,026 A | 4/1986 | Stoll |
| 4,590,358 A * | 5/1986 | Stol ........................... 219/136 |
| 4,904,843 A * | 2/1990 | Hori et al. ............. 219/137 PS |
| 6,198,068 B1 * | 3/2001 | Lindstrom ............. 219/121.46 |

FOREIGN PATENT DOCUMENTS

| DE | 3247433 | 7/1984 |
| JP | 59-215267 A | * 12/1984 |
| JP | 2000-312975 | 11/2000 |
| WO | WO98/21000 | * 5/1998 |

* cited by examiner

Primary Examiner—Clifford C. Shaw
(74) Attorney, Agent, or Firm—Collard & Roe, P.C.

(57) ABSTRACT

The invention describes a method of brazing workpieces (16) with a torch (10), in particular a plasma or welding torch, having an electrode (28), in which a transmitted and/or non-transmitted working arc supplied with power from a power source or a current source (2) is produced in order to generate a plasma beam from a delivered plasma gas, whereby at least one filler material (38) is fed to the seam region of the workpieces (16) to be joined. The filler material (38) is connected to the or to another power source or current source (39). To this end, one potential (40) of the power source or current source (39) is applied to the filler material (38) and the other potential (35, 41) to the workpieces (16). The power source or current source (39) is regulated in such a way that when the filler material (38) is lifted off the workpiece (16) an arc is prevented from being generated.

10 Claims, 2 Drawing Sheets

METHOD FOR SOLDERING WORK PIECES

CROSS REFERENCE TO RELATED APPLICATIONS

Applicants claim priority under 35 U.S.C. §119 of Austrian Application No. A 204/2001 filed on 9 Feb. 2001. Applicants also claim priority under 35 U.S.C. §365 of PCT/AT02/00036 filed on 31 Jan. 2002. The international application under PCT article 21(2) was not published in English.

The invention relates to a method of brazing workpieces with a torch, in particular a plasma or welding torch, as well as a plasma welding torch.

A method of brazing workpieces with a torch, in particular a plasma torch, with a non-consumable electrode is disclosed in patent specification WO 98/21000 A1. Power is applied from a current source to an arc at the torch, which is transmitted or not transmitted, in order to produce a plasma beam from a delivered plasma gas. A filler material is delivered to the seam region of the workpieces to be joined, which becomes liquid due to the heat energy of the plasma beam or arc, causing the filler material to form a pool of melt in the seam region of the two workpieces. The disadvantage of this is that a considerable amount of heating energy must be generated by the plasma beam or arc in order to liquefy the filler material, which significantly reduces the temperature of the melt pool.

Another plasma or cutting device is disclosed in U.S. Pat. No. 4,087,671 A.,which is suitable for brazing workpieces with a torch, in particular a plasma or cutting torch, and has an electrode. The torch is connected to a current source in order to generate a transmitted or non-transmitted working arc to produce a plasma beam from a delivered plasma gas. At least one filler material is delivered to the seam region of the workpieces to be joined and the filler material is connected to the current source or to another current source. To this end, one potential of the current source is applied to the filler material and the other potential to the workpiece. The disadvantage of this system is that the power supply for the filler material is not controlled and there is no way of preventing an arc being struck between the filler material and the workpieces.

The underlying objective of the invention is to propose a method of brazing workpieces, whereby the process stability for a brazing process is improved.

This objective is achieved by the invention due to the fact that the filler material is connected to the or to another power source or current source and to this end one potential of the power source or current source is applied to the filler material and the other potential to the workpieces, and the power source or current source, in particular the power delivered by the current source, is controlled in such a way that when the filler material is lifted off the workpiece, an arc is prevented from being struck.

The advantage of this is that by supplying the filler material with power, in particular electrical energy, it can be heated separately irrespective of external influences, in particular heat generated by the plasma beam or working arc, to a temperature that is below the melting point of the filler material, requiring only a very low amount of energy to be applied in order to transform the filler material into the liquid state, in particular via the working arc or plasma beam generated. This means that the heat applied via the torch, in other words the power supply of the torch, can be very significantly reduced, thereby preventing the base material of the workpieces from melting. Another major advantage is that by using the so-called hot wire technique, in other words by pre-heating the filler material, a very high melt pool temperature can be obtained, which considerably improves the wettability of the liquid filler material, in particular the braze, simultaneously improving the reliability of the process without having to introduce more energy into the base material of the workpieces. This is achieved due to the fact that in order to render the filler material liquid, only a very small amount of heat energy is drawn from the plasma beam or working arc and almost the entire energy supplied by the plasma beam or working arc is available for heating the base material of the workpieces and the pool of melt. Another advantage is that pre-heating the filler material improves the process of melting the filler material, thereby preventing spatter.

The invention is illustrated in detail on the basis of examples of embodiments illustrated in the drawings.

The embodiments of the invention will be described in more detail below.

Figure 1:
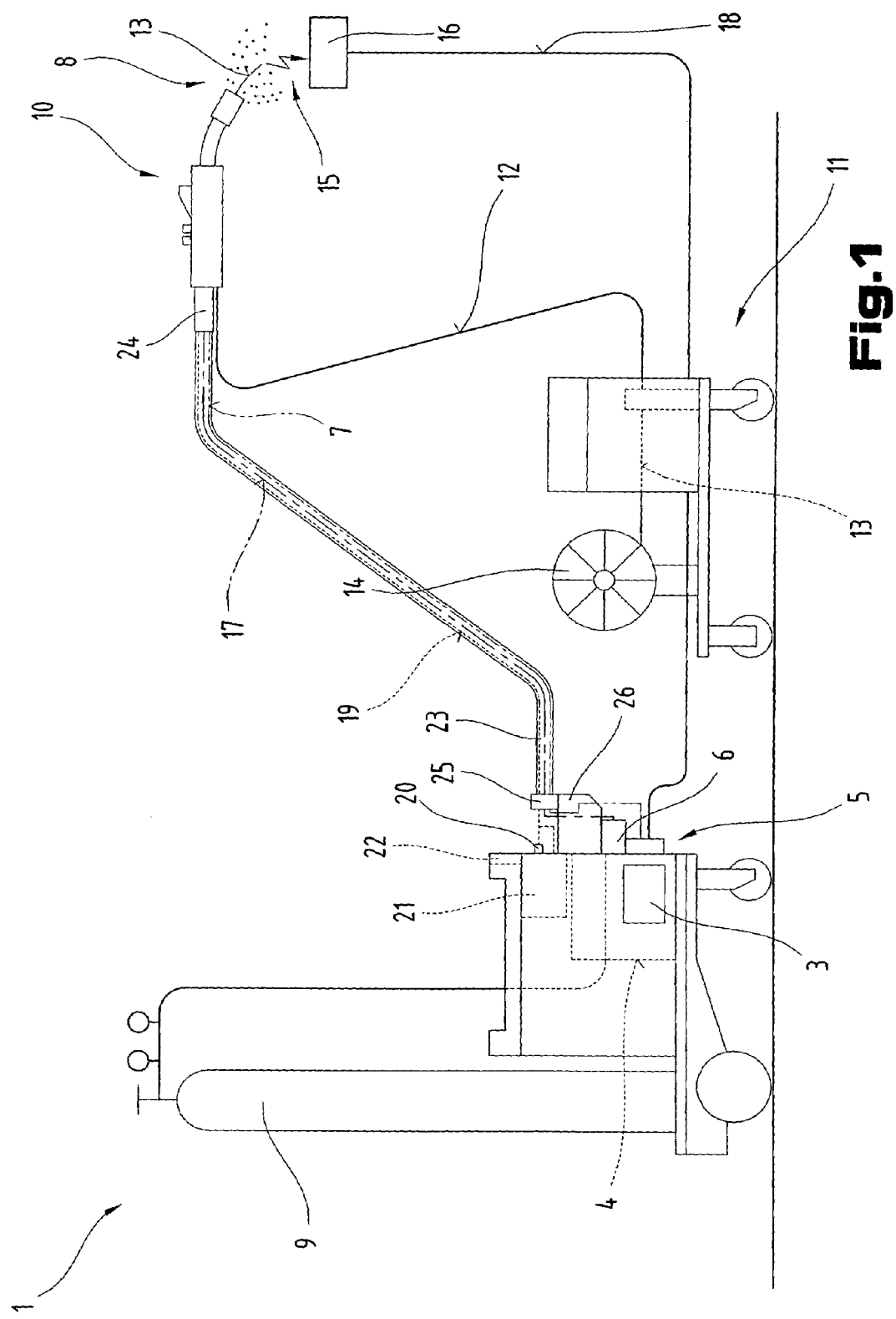
FIG. 1 is a schematic diagram of a welding machine or a welding apparatus.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a welding system and a welding device 1 and plasma apparatus for running a whole range of welding processes, e.g. MIG-MAG welding and WIG/TIG welding or electrode welding processes, double wire/tandem welding processes, plasma or brazing processes. Clearly, the solution proposed by the invention may be used with a current source or a welding current source.

The welding device 1 or the plasma device has a power source or a current source 2 with a power component 3, a control system 4 and a switching element 5 co-operating with the power component 3 and control system 4. The switching element 5 or the control system 4 is connected to a control valve 6 incorporated in a supply line 7 for a gas 8, in particular a protective gas such as $CO_2$, helium or argon and such like, running between a gas storage 9 and a torch or welding torch 10.

Furthermore, a wire feed device 11 such as commonly used for MIG-MAG welding may also be activated via the control system 4 in order to feed an filler material or welding wire 13 from a supply reel 14 through a supply line 12 into the region of the torch 10. Clearly, the wire feed device 11 could also be integrated in the welding device 1, in particular in the basic housing, in a manner known from the prior art, rather than used as an add-on device as illustrated in FIG. 1.

It would also be possible for the wire feed device 11 to feed the welding wire 13 or filler material to the process area externally to the torch 10 or welding torch, in which case the torch 10 is preferably provided with a non-consumable electrode.

The current needed to strike an arc 15, in particular a working arc, between the welding wire 13 or non-consumable electrode and a workpiece 16 is fed via a supply line 17 from the power component 3 of the current source 2 to the welding torch 10, in particular to the welding wire 13 or electrode, and the workpiece 16 to be welded is also connected to the welding device 1, in particular to the current source 2, via another supply line 18 so that a current circuit can be established across the arc 15 in order to run a process.

In order to cool the torch 10, the torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the torch 10 is switched on, thereby enabling the torch 10 and the welding wire 13 to be cooled.

The welding device 1 also has an input and/or output device 22, by means of which a whole range of settings can be entered for welding parameters and operating modes or welding programmes of the welding device 1 or plasma device. The welding parameters, operating parameters or welding programmes entered at the input and/or output device 22 are then forwarded to the control system 4, from where they are applied to the individual components of the welding system and the welding device 1.

In the embodiment illustrated as an example here, the torch 10 is also connected to the welding device 1 and the welding system by means of a hose pack 23. The individual lines from the welding device 1 to the torch 10 are disposed in the hose pack 23. The hose pack 23 is connected by means of a connector device 24, known from the prior art, to the torch 10, whilst the individual lines in the hose pack 23 are connected to the individual contacts of the welding device 1 by means of connecting sockets and plug connectors. To relieve tension on the hose pack 23, the hose pack 23 is connected via a tension-relieving device 25 to a housing 26, in particular the basic housing of the welding device 1.

It should basically be pointed out that not all the components mentioned above necessarily have to be used for the various welding process and welding devices, such as WIG devices or MIG/MAG devices or plasma devices.

Figure 2:
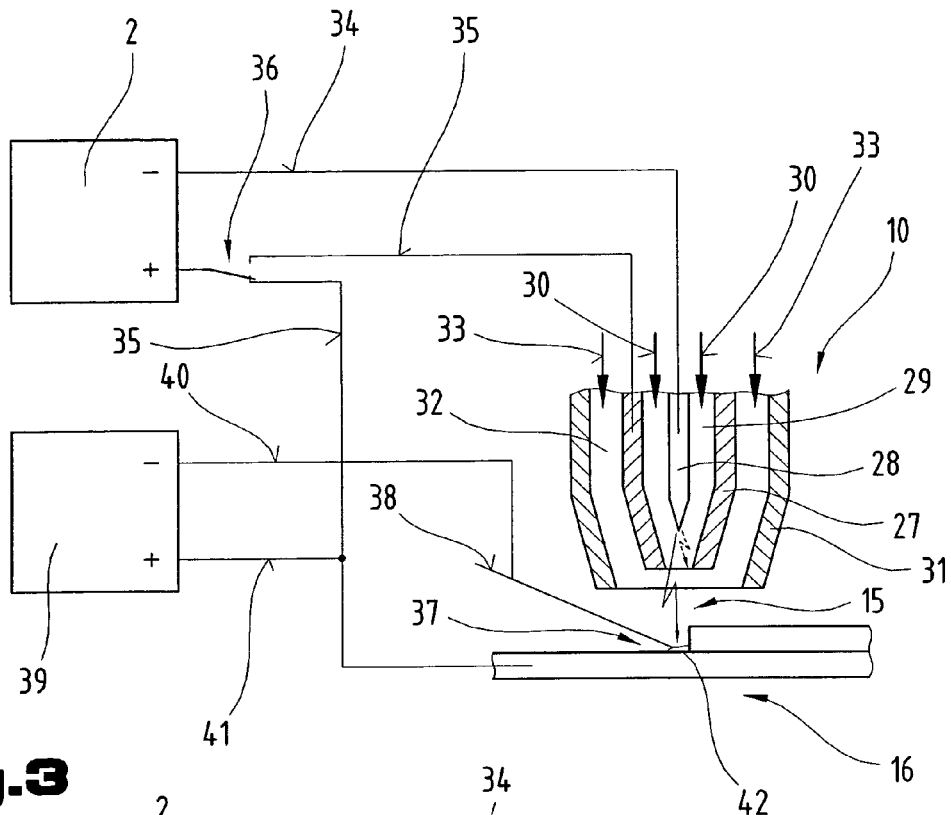
FIG. 2 is a simplified schematic diagram illustrating the structure of a plasma torch and the components needed to implement the method.

FIG. 2 is a very simplified, schematic diagram showing the standard structure used for the torch, which is a commercially available plasma torch.

For operating purposes, the torch 10 has a plasma nozzle 27, in which a non-consumable electrode 28 is disposed, whereby a plasma gas, delivered externally as schematically indicated by arrow 30, is fed through a passage 29 of the plasma nozzle 27. It is also possible for the plasma nozzle 27 to be enclosed by a gas nozzle 31. This being the case, another passage 32 will in turn be provided between the plasma nozzle 27 and the gas nozzle 31 and supplied externally with a protective gas, as schematically indicated by arrow 33.

In terms of power supply, the torch 10 is connected to the power source or the current source 2, to enable a working arc or arc 15, which may or may not be transmitted, to be built up in order to produce a plasma beam from the delivered plasma gas. In the embodiment illustrated as an example here, the power supply for the working arc or arc 15 is produced by connecting the non-consumable electrode 28 to a potential 34, in particular negative, of the current source 2. In order to able to generate a transmitted working arc, the other, in particular the positive potential 35 of the current source 2 is applied to the workpieces 16 to be brazed so that a working arc can be struck between the electrode 28 and the workpieces 16.

However, it is also possible to generate an arc 15 that is not transmitted—indicated by broken lines—in which case the non-consumable electrode 28 is connected to the negative potential 34 in particular of the current source 2, whereas the plasma nozzle 27 is connected via a switching device 36 to the other, in particular positive, potential 35 of the current source 2.

In order to give the user the option of selecting a transmitted or a non-transmitted working arc as required, the switching device 36 can be switched to different positions enabling the best operating mode to be selected at any time, depending on the material of the workpieces 16. Naturally, the system could be set up so that the arc is transmitted only or not transmitted only or both operations run at the same time.

In order to run a brazing process to join the workpieces 16 to be joined using the structure illustrated here, a filler material 38, in the form of one or more wires, in particular one or more endless welding wires, schematically indicated as a welding wire, is fed into the seam region 37 of the workpieces 16 to be joined. In the embodiment illustrated as an example here, the filler material 38 is connected to another current source 39 and a potential 40 of the current source 39, negative in particular, is applied to the filler material 38 whilst the other, in particular positive, potential 41 is applied to the workpieces 16, the current source 39, in particular the power supply of the current source 39, being regulated in such a way that when the filler material 38 is lifted off the workpiece 16 or moved away from a pool of melt 42, an arc is prevented from being struck.

As a result of this additional power supply, a current circuit is established when the filler material 38 comes into contact with the workpiece 16 and the resultant flow of current heats the filler material 38. To ensure that heating of the filler material 38 is kept constant, the filler material 38 is placed in contact with the workpiece 16 or the pool of melt 42, formed by the liquefied filler material 38 during a process, in particular during a brazing process. It would naturally also be possible to use only a single current source 2 or 39 instead of providing a second current source 39. In situations where only a single current source 2 or 39 is used, the latter is set up so that it has two power circuits which can be regulated and controlled separately from one another, thereby enabling the arc and the current circuit via the filler material 38 to be supplied with power independently of one another.

The current source 39 supplies the filler material 38 with power, in particular with a variable, constant or pulsed current, in such a way that the filler material 38 is heated to just below its melting temperature. The settings at the current source 39 may be specifically adapted to the particular material used for the filler material 38, for example, enabling the settings to be automatically retrieved from values stored accordingly. Clearly, it would also be possible for a user to input the parameters, in particular the current level, directly at the current source 39. The current source 39 also ensures that if the filler material 38 is undesirably lifted away from the workpiece 16 or is moved away from the pool of melt 42, an arc, which would cause the base material of the workpieces 16 to melt, is prevented.

As a result of the specific amount of heat introduced into the filler material 38 and because the filler material 38 is heated, the power supply of the working arc, in particular a plasma arc power, is reduced to a value at which it is predominantly the base material of the workpieces 16 which is heated and only a residual amount of energy is delivered to the filler material 38 to fully melt it, i.e. the power of the plasma arc can be reduced to the degree that the resultant plasma arc or working arc can be guaranteed not to melt the base material of the workpieces 16 and the workpieces 16 are now merely heated. It may therefore be said that the power supply of the working arc, in particular the plasma arc power, is controlled in such a way that the base material of the workpieces 16 does not melt at all.

As a result of the so-called hot wire technique, in other words by additionally heating the filler material, the pool of melt reaches a significantly higher temperature because heat is applied simultaneously to the pool of melt 42 by the plasma beam or working arc and to the filler material 38, which means that not so much heat is absorbed by the filler material 38 as would be if it had not been not heated, i.e. in standard brazing process known from the prior art, the filler material 38 is not heated and is therefore dipped cold into the pool of melt 42, which means that the filler material 38 needs to absorb a high amount of energy in order for it to melt and this heat energy is therefore drawn off from the pool of melt 42 and plasma beam or the working arc. In order to be able to compensate for this, it is then necessary to increase the power level, in particular the plasma arc power, and there is no longer any guarantee that the base material of the workpieces 16 will not melt.

As a result of the high melt pool temperature which can now be obtained, the wettability of the filler material 38, in particular the welding wire or braze delivered, is very much increased. The reliability of the process is also significantly improved without having to apply more energy to the base material of the workpieces 16. The essential factor with the method proposed by the invention is that the filler material 38 is pre-heated to the degree that only a small amount of heat is then needed to render the filler material 38 liquid. Furthermore, because of the high melt pool temperature and because the filler material 38 is pre-heated, the filler material 38 used may be one whose melting point is the same as or higher than the base material of the workpieces 16, because the filler material 38 is heated separately by the current source 39 to just below the melting point of the filler material 38 and the residual energy needed to render the filler material 38 liquid is supplied by the plasma beam or working arc.

Since the operating sequence of the method is the same as that used in the prior art, it will not be described in detail. It should merely be mentioned that, at the start of brazing, in other words at the start of the process, the current source 2 for the working arc is switched on first of all, for example, so that the working arc and hence a hot plasma beam can be generated from the start. The wire feed device 11 (not illustrated in FIG. 2) and the current source 39 for the filler material 38 are then switched on so that a current circuit can be established when the filler material 38 comes into contact with the workpiece, thereby enabling a heating phase of the brazing process to be run if necessary, depending on the sequence. The brazing process is run in the same way as a welding process, i.e. the torch 10 is guided along the joining point of the two workpieces 16 and a pool of melt 42 is formed from the filler material 38 accordingly.

During this process, the current source 39 for the filler material 38 may be provided in the form of a constant current source with voltage limitation so that an arc is not formed when the filler material 38 is moved out of the pool of melt 42 or is lifted away from the workpiece 16. The current source 39 is therefore operated in constant current mode or pulsed mode, and if operated in pulsed mode, synchronous wire pulses are also possible, i.e. the filler material is fed along at a constant or pulsed wire feed rate, in other words the filler material 38 is fed in a forwards/backwards motion or a forwards/stop motion.

Figure 3:
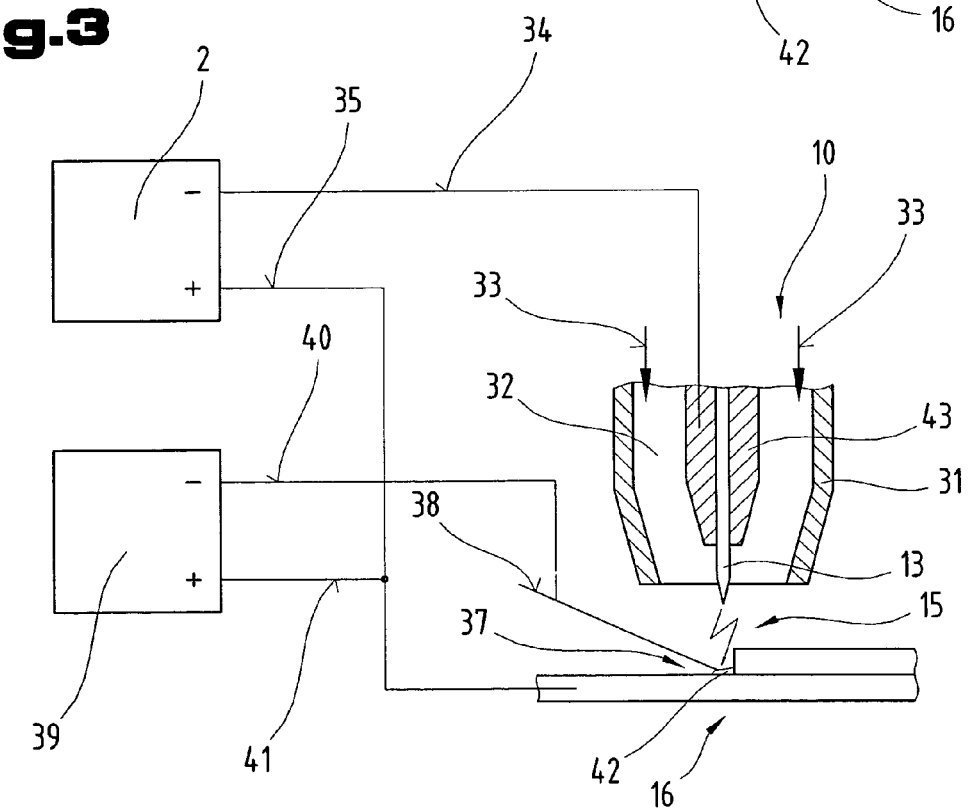
FIG. 3 is a simplified schematic diagram illustrating the structure of a welding torch and the components needed to implement the method.

FIG. 3 illustrates another embodiment using a welding torch of a type known form the prior art. Since the basic structure of this type of torch 10 is known, it will not be described in detail.

The torch 10, in particular the welding torch, has a contact tube 43, through which a consumable welding wire 13 acting as an electrode is fed, the contact tube 43 being enclosed by a gas nozzle 31. In the embodiment illustrated as an example here, the filler material 38, which is again connected to the current source 39, is fed to the seam region 37 and to the workpieces 16 externally to the torch 10, as schematically indicated. The filler material 38 may be fed from the wire feed device 11 (illustrated in FIG. 1) through a guide device, which may be attached to the torch 10—not illustrated—for example.

Since the plasma arc power can be reduced in the manner described in connection with FIG. 2 as a result of the method proposed by the invention, a consumable welding wire 13 can now serve or be used as the electrode, i.e. the plasma arc power, in particular the power supply for the arc 15 struck between the welding wire 13 and the workpieces 16 is regulated in such a way that melting of the welding wire 13 and simultaneously melting of the base material of the workpieces 16 is prevented. The base material of the workpieces 16 is now heated by the arc 15 or the plasma arc. It may therefore be said that a consumable welding wire 13 is used as an electrode and the power supply of the welding wire 13 is controlled in such a way that the welding wire 13 is prevented from melting and a brazing process can be run by feeding and heating the filler material 38.

As descried above in connection with FIG. 2, the filler material 38 is heated by a separate current circuit, in particular the current circuit 39, so that as the filler material 38 is fed along, the low arc power of the arc 15 or working arc is enough to heat the base material as necessary and simultaneously make up the heat energy still needed to render the filler material 38 liquid.

Using a set-up of this type, therefore, it is possible to run a welding process with a welding torch, during which the base material of the workpieces 16 is fused and the welding wire 13 melted accordingly, and to run a brazing process during which a filler material 38 is fed along and melted. All that is needed to achieve this is that the filler material 38 and the welding parameters must be controlled accordingly, i.e. during a welding process, the filler material 38 is swung or fed externally to the welding area or seam region 37 and the welding parameters raised in order to melt the welding wire 13, whereas in a brazing process the controls and regulations described in connection with FIG. 2 are applied.

Consequently, using only one torch 10 or only one welding/brazing system, such as used on a production line in the automotive industry for example, two different processes can be run consecutively, namely a welding process and a brazing process, without the need for two separate sets of apparatus, as is currently the case, i.e. in the case of body building, for example, all the brazed joints can be made first with the welding torch 10 and then afterwards the weld joints, or vice versa, on the same vehicle body with the same torch 10 or with the same welding/brazing apparatus. The only thing needed to achieve this is to programme or set the individual parameters to run the process accordingly.

Naturally, if using a two-wire or multi-wire torch 10 where each of the individually fed welding wires 13 has a separate current circuit, , these may be controlled or regulated in such a way that one welding wire 13 acts as the electrode and the arc is controlled so that no melting occurs and the or the other welding wires 13 is/are operated as the filler material 38 and are heated via the current circuit. Consequently, one welding wire 13 can be replaced by a non-consumable electrode. A torch 10 can therefore be used in which all the wires delivered, in particular the welding wires 13 or filler materials 38, are disposed inside the torch 10. A torch 10 of this type could then also be used to run a welding process and a brazing process in turn by setting the welding parameters accordingly, as described above.

For the sake of good order, it should be pointed out that in order to provide a clearer understanding of the structure of the welding device 1, it and its constituent parts are illustrated to a certain extent out of proportion and/or on an enlarged and/or reduced scale.

The individual solutions used by the invention to achieve the set objective may be found in the description.

Above all, the individual embodiments illustrated in FIGS. 1; 2; 3 may be construed as independent solutions proposed by the invention in their own right. The associated objectives and solutions proposed by the invention may be found in the detailed description of the drawings.

| List of reference numbers | |
|---|---|
| 1 | Welding device |
| 2 | Current source |
| 3 | Power component |
| 4 | Control system |
| 5 | Switching element |
| 6 | Control valve |
| 7 | Supply line |
| 8 | Gas |
| 9 | Gas storage |
| 10 | Torch |
| 11 | Wire feed device |
| 12 | Supply line |
| 13 | Welding wire |
| 14 | Supply reel |
| 15 | Arc |
| 16 | Workpiece |
| 17 | Welding line |
| 18 | Welding line |
| 19 | Coolant circuit |
| 20 | Flow indicator |
| 21 | Water container |
| 22 | Input and/or output device |
| 23 | Hose pack |
| 24 | Connecting device |
| 25 | Tension-relieving device |
| 26 | Housing |
| 27 | Plasma nozzle |
| 28 | Electrode |
| 29 | Passage |
| 30 | Arrow |
| 31 | Gas nozzle |
| 32 | Passage |
| 33 | Arrow |
| 34 | Potential |
| 35 | Potential |
| 36 | Switching device |
| 37 | Seam region |
| 38 | Filler material |
| 39 | Current source |

-continued

| List of reference numbers | |
|---|---|
| 40 | Potential |
| 41 | Potential |
| 42 | Pool of melt |
| 43 | Contact tube |

What is claimed is:

1. Method of brazing workpieces with a torch, in particular a plasma or welding torch, having an electrode, in which a transmitted and/or non-transmitted working arc, supplied with power from a power source or a current source, is produced in order to generate a plasma beam from a delivered plasma gas, whereby at least one filler material is fed to the seam region of the workpieces to be joined, characterized in that the filler material (38) is connected to the or to another power source or current source (2, 39) in such a way that one potential (34, 35, 40, 41) of the power source or current source (2, 39) is applied to the filler material (38) and the other potential (34, 35, 40, 41) to the workpieces (16), and the power source or current source (2, 39), in particular the power delivered by the power source or current source (2, 39), is regulated in such a way that when the filler material (38) is lifted off the workpiece (16) an arc is prevented from being struck.

2. Method as claimed in claim 1, characterized in that the filler material (38) is placed in contact with the workpiece (16) or a pool of melt (42) during the brazing process.

3. Method as claimed in claim 1, characterized in that a single current source (2 or 39) is used, and it is set up so as to have two power circuits which can be controlled and regulated separately from one another.

4. Method as claimed in claim 1, characterized in that the filler material (38) is supplied with power, in particular with a variable, constant or pulsed current, in such a way that the filler material (38) is heated to just below its melting temperature.

5. Method as claimed in claim 1, characterized in that by applying a specific amount of heat to the filler material (38), the power supply of the working arc, in particular the plasma arc power, can be reduced to a value at which it is predominantly the base material of the workpieces (16) which is heated and only a residual amount of energy needed to fully melt it is applied to the filler material (3).

6. Method as claimed in claim 1, characterized in that the power supply of the working arc, in particular the plasma arc power, is regulated in such a way that the base material of the workpieces (16) does not melt.

7. Method as claimed in claim 1, characterized in that the filler material (38) is fed in the form of one or more wires, in particular one or more endless welding wires (13).

8. Method as claimed in claim 1, characterized in that the filler material (38) is fed at a constant or pulsed wire feed rate.

9. Method as claimed in claim 1, characterized in that the melting point of the filler material (38) is the same as or higher than the base material of the workpieces (16).

10. Method as claimed in claim 1, characterized in that a consumable welding wire (13) is used as an electrode and the power supply of the welding wire (13) is regulated in such a way that the welding wire (13) is prevented from melting.

* * * * *

UNITED STATES PATENT AND TRADEMARK OFFICE
CERTIFICATE OF CORRECTION

| | | |
|---|---|---|
| PATENT NO. | : 7,009,143 B2 | Page 1 of 1 |
| APPLICATION NO. | : 10/470209 | |
| DATED | : March 7, 2006 | |
| INVENTOR(S) | : Mörtendorfer et al. | |

It is certified that error appears in the above-identified patent and that said Letters Patent is hereby corrected as shown below:

Title Page, Item [75], after "Martin Gatterbauer", please change "Weis (AT)" to correctly read: --Wels (AT)--.

Signed and Sealed this

Twenty-fifth Day of July, 2006

JON W. DUDAS
*Director of the United States Patent and Trademark Office*